(12) United States Patent
Huang et al.

(10) Patent No.: US 7,522,590 B2
(45) Date of Patent: Apr. 21, 2009

(54) MANAGING MESSAGE ARRIVAL TO ENSURE PROPER MATCHING OF UNORDERED MESSAGES

(75) Inventors: Su-Hsuan Huang, Fishkill, NY (US); William G. Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 10/685,144

(22) Filed: Oct. 14, 2003

(65) Prior Publication Data
US 2005/0078605 A1     Apr. 14, 2005

(51) Int. Cl.
*H04L 12/28* (2006.01)

(52) U.S. Cl. .................. 370/389; 370/394; 370/429

(58) Field of Classification Search ........... 370/394, 370/429, 389
See application file for complete search history.

(56) References Cited

U.S. PATENT DOCUMENTS

| | | | |
|---|---|---|---|
| 5,541,995 A | 7/1996 | Normile et al. | 380/42 |
| 5,542,075 A | 7/1996 | Ebcioglu et al. | 395/700 |
| 5,588,117 A | 12/1996 | Karp et al. | 395/200.03 |
| 5,617,561 A | 4/1997 | Blaauw et al. | 395/500 |
| 5,648,970 A | 7/1997 | Kapoor | 370/394 |
| 5,799,146 A | 8/1998 | Badovinatz et al. | 395/182.02 |
| 5,832,272 A | 11/1998 | Kalantery | 395/706 |
| 5,901,291 A | 5/1999 | Feeney et al. | 395/200.83 |
| 6,327,630 B1 | 12/2001 | Carroll et al. | 709/314 |
| 6,330,600 B1 | 12/2001 | Matchefts et al. | 709/223 |
| 6,397,352 B1 | 5/2002 | Chandrasekaran et al. | 714/16 |
| 6,493,343 B1 | 12/2002 | Garcia et al. | 370/394 |
| 6,738,379 B1 * | 5/2004 | Balazinski et al. | 370/394 |
| 7,072,352 B2 * | 7/2006 | Lebizay et al. | 370/425 |
| 7,072,973 B1 * | 7/2006 | Newson et al. | 709/232 |
| 7,180,895 B2 * | 2/2007 | Smith | 370/394 |
| 2001/0034788 A1 * | 10/2001 | McTernan et al. | 709/232 |

\* cited by examiner

*Primary Examiner*—Edan Orgad
*Assistant Examiner*—Jay P Patel
(74) *Attorney, Agent, or Firm*—Geraldine Monteleone, Esq.; Kevin P. Radigan, Esq.; Heslin Rothenberg Farley & Mesiti, P.C.

(57) ABSTRACT

Messages arriving at a receiver are managed to ensure proper ordering of the messages. To facilitate proper ordering, a message sequence number is used, as well as matching criteria to match a correctly sequenced message with a posted receive. In response to processing a message, a check is made as to whether previously out of order messages can now be processed.

15 Claims, 9 Drawing Sheets

UNMATCHED MESSAGES BUFFER 360

362

| SEQ. No. 364 | TAG 366 | GROUP No. 368 | SOURCE 370 | DATA 372 |
|---|---|---|---|---|
| ⋮ | ⋮ | ⋮ | ⋮ | ⋮ |
| 11 | 1000 | 7 | 2 | ... |
| ⋮ | ⋮ | ⋮ | ⋮ | ⋮ |
| ⋮ | ⋮ | ⋮ | ⋮ | ⋮ |
| 13 | 1000 | 8 | 1 | ... |
| 16 | 1000 | 8 | 1 | ... |
| 14 | 1000 | 8 | 1 | ... |
| 18 | 1000 | 7 | 2 | ... |
| 18 | 1000 | 7 | 1 | ... |
| ⋮ | ⋮ | ⋮ | ⋮ | ⋮ |

MANAGING MESSAGE ARRIVAL TO ENSURE PROPER MATCHING OF UNORDERED MESSAGES

TECHNICAL FIELD

This invention relates, in general, to message handling, and in particular, to managing out of order messages received by a receiver.

BACKGROUND OF THE INVENTION

There are various types of communications environments, and each type may handle messages differently. In one type of communications environment, messages are transported from a sender of the environment to a receiver of the environment, but the order of the messages is not guaranteed. For example, in the Internet Protocol Suite/User Datagram Protocol (UDP/IP), user datagrams (packets) can be dropped in the communications network, causing out of order arrivals when packets are retransmitted. For those environments in which ordering is not guaranteed, measures need to be taken to ensure proper processing of messages.

For environments such as the Transmission Control Protocol (TCP/IP), in which a sequential byte stream is to be presented to the user, a sequence number within the fixed-length UDP/IP datagram suffices to determine the memory location into which the packet is copied. As long as all the packets arrive, there is no requirement that they be stored in any particular order.

Another type of communications environment is a message passing environment, in which the receiver specifies selection criteria for matching incoming messages. Arriving messages that cannot be immediately matched are stored in an unmatched message queue, which is searched each time a receiver provides a new set of specification criteria (called posting a receive). Examples of such systems include the IBM Parallel Environment Message Passing Interface.

Up to now, message passing environments have been built on top of lower level subsystems that provide an in-order delivery of messages, such as TCP/IP. However, the advent of multi-link, high performance packet switched networks has led to the development of message delivery subsystems that do not promise in-order message delivery. Thus, a need exists for a capability that efficiently handles out-of-order delivery in a message passing environment.

SUMMARY OF THE INVENTION

The shortcomings of the prior art are overcome and additional advantages are provided through the provision of a method of managing message arrival at a receiver of a communications environment. The method includes, for instance, determining whether a message received by the receiver is in sequence order, the determining using a sequence number of the message; and attempting to match the message with a posted receive, in response to the determining indicating that the message is in sequence order.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3d depicts one embodiment of an unmatched messages buffer used in accordance with an aspect of the present invention;

BEST MODE FOR CARRYING OUT THE INVENTION

In accordance with an aspect of the present invention, a capability is provided for managing message arrival at a receiver of a communications environment. This management includes, for instance, ensuring the proper sequencing of the messages arriving at the receiver. In one example, proper sequencing is provided through using a combination of message sequence numbers with matching criteria to determine whether a message is ready to be processed.

Figure 1A:
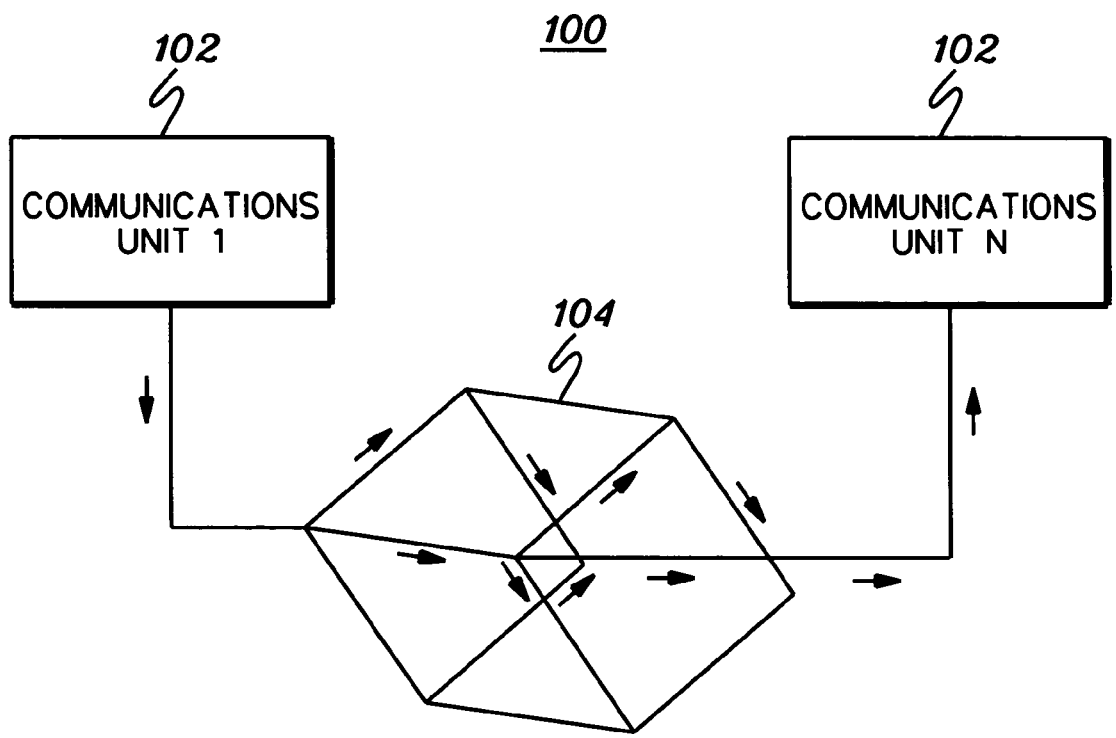
FIG. 1a depicts one embodiment of a communications environment incorporating and using one or more aspects of the present invention.

One embodiment of a communications environment incorporating and using one or more aspects of the present invention is described with reference to FIG. 1a. As shown in FIG. 1a, a communications environment 100 includes, for instance, a plurality of communications units 102 coupled to one another via a connection 104. As an example, the communications environment is a parallel operating environment and communications unit 102 includes a pSeries server executing AIX, offered by International Business Machines Corporation, Armonk, N.Y. Details regarding a parallel operating environment for AIX are described in a publication entitled, "Operation and Use, Volume 1 Using the Parallel Operating Environment," Publication Number SA22-7425-01, Version 3 Release 2, Second Edition (December 2001), http://publib.boulder.ibm.com/doc_link/en_US/a_doc_lib/ sp34/pe/html/am102mst.html, which is hereby incorporated herein by reference in its entirety.

Connection 104 may include various types of connections, such as any type of wire connection, token ring or network connection to name just a few examples. In the example shown, the connection is a multi-route interconnect in which a message can take one of several routes through the interconnect with the result that messages may arrive out of order compared to the order in which they were sent. One example of such an interconnect is the SP Switch2 available from International Business Machines Corporation, Armonk, N.Y.

Figure 1B:
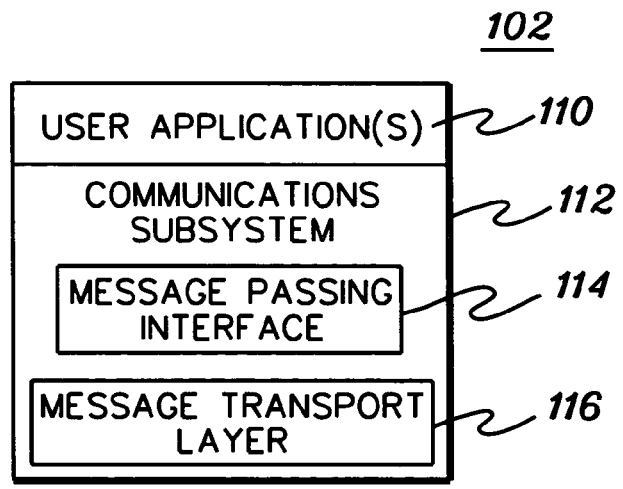
FIG. 1b depicts one embodiment of further details associated with a communications unit of the communications environment of FIG. 1a, in accordance with an aspect of the present invention.

Further details regarding a communications unit are described with reference to FIG. 1b. In one embodiment, communications unit 102 includes one or more user applications 110 executing thereon and a communications subsystem 112 used in communicating between the communications units.

Communications subsystem 112 includes, for instance, a message passing interface 114 and a message transport layer 116. One example of a message passing interface is the industry-established MPI Standard available at http://www-unix.mcs.anl.gov/mpi/index.html, which is hereby incorporated herein by reference in its entirety. The message passing interface includes a library that is responsible for providing a set of subroutines to be called by applications to cause messages to be sent or received. The library is responsible for implementing the proper rules for matching messages according to MPI standards. With the message passing interface protocols, messages sent by a sender are to be matched to specifications posted by a receiver that specify the messages for which the receiver is waiting. The MPI library is responsible for maintaining the internal data structures used in matching the messages. It is also responsible for returning status to the user, such as the length of the message. Features of MPI are described in an IBM Publication SA22-7422-01 entitled, "MPI Programming Guide" Version 3, Release 2, (December, 2001), http://publib.boulder.ibm.com/doc_link/en_US/a_doc_lib/sp34/pe/html/am106mst.html, which is hereby incorporated herein by reference in its entirety.

The message transport layer 116 is responsible for taking the specification of a message and its data and transporting them reliably to a destination. It notifies the agent (e.g., MPI) on the receiver side that the message is there. While the transport layer reliably sends a message, it does not guarantee that messages arrive in any particular order. In one example, the message transport layer includes a Low-Level Application Programming Interface (LAPI). LAPI is described in articles entitled, "Understanding the LAPI" and "Using the LAPI" available from IBM and at http://www.research.ibm.com/actc/opt_lib/LAPI_under.htm, as well as in "Parallel System Support Programs for AIX—Administration Guide," IBM Publication Number SA22-7348-05, May 2003; and "Parallel System Support Programs for AIX—Command and Technical Reference," Volume 2—SA22-7351-05, May 2003, each of which is hereby incorporated herein by reference in its entirety.

An overview of sending a message from one communications unit to another communications unit is described with reference to FIGS. 2a-2b. In this example, one communications unit is a sender and another is a receiver. Each communications unit may be a sender, a receiver or both depending on the call that is issued by the user. The communications subsystem in this example uses MPI and LAPI, but in other examples, it may use other interfaces and/or transport layers in which the receiver provides message matching specifications.

Figure 2A:
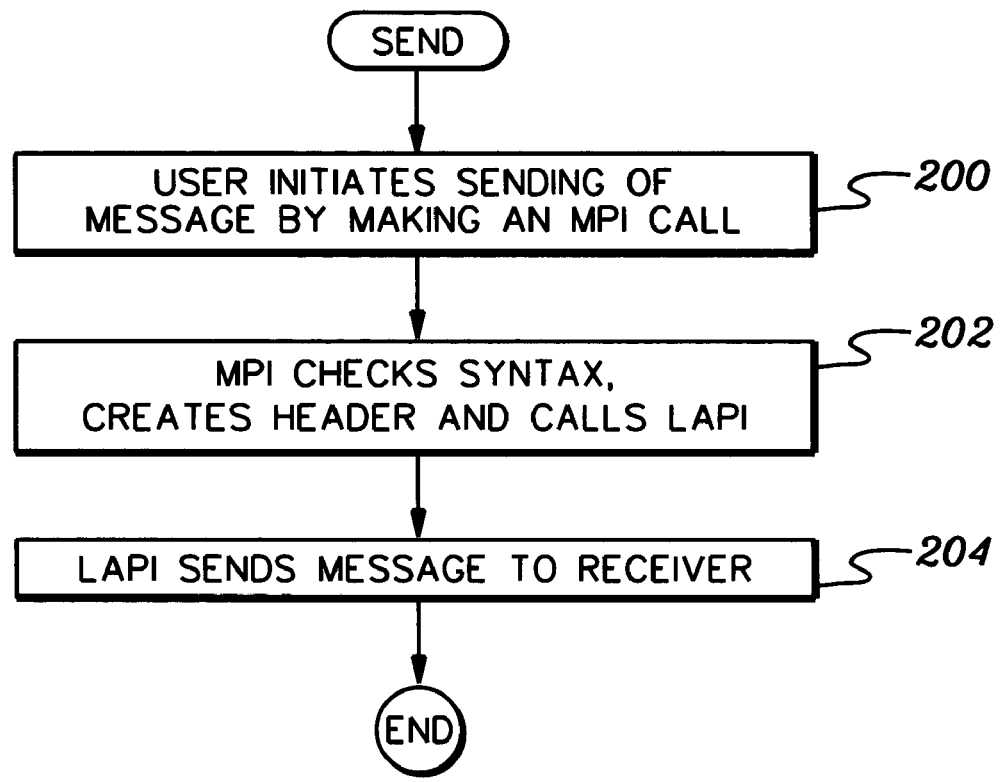
FIG. 2a depicts one embodiment of the logic associated with sending a message from a sender to a receiver, in accordance with an aspect of the present invention.

Referring to FIG. 2a, a user application has an area of memory in a sender that includes data called a message that is to be sent to a receiver. The user initiates the sending of the message by making an MPI send call, STEP 200. The call identifies the address of the message to be sent, the destination of the receiver, as well as other information relating to the message. This information includes, for instance, a tag which identifies the message; a group which identifies a communication sub-domain (e.g., a set of messages for one particular part of the application or an MPI Communicator); and the length of the message.

When the MPI library receives the MPI send call, it checks the syntax of the call and creates a header (sometimes called an envelope) for the message, STEP 202. The header includes the source, destination, group, tag, and message sequence number. The sequence number is an increasing number that is associated with a message. This message sequence number is distinct from the packet sequence numbers associated with the packets of a message, that may be used by the transport layer. MPI passes this larger message (e.g., header plus data, including user's message buffer) to LAPI.

In response to receiving the call, LAPI takes the message and decomposes it into one or more packets, each of which is sent out over the interconnect, STEP 204.

Figure 2B:
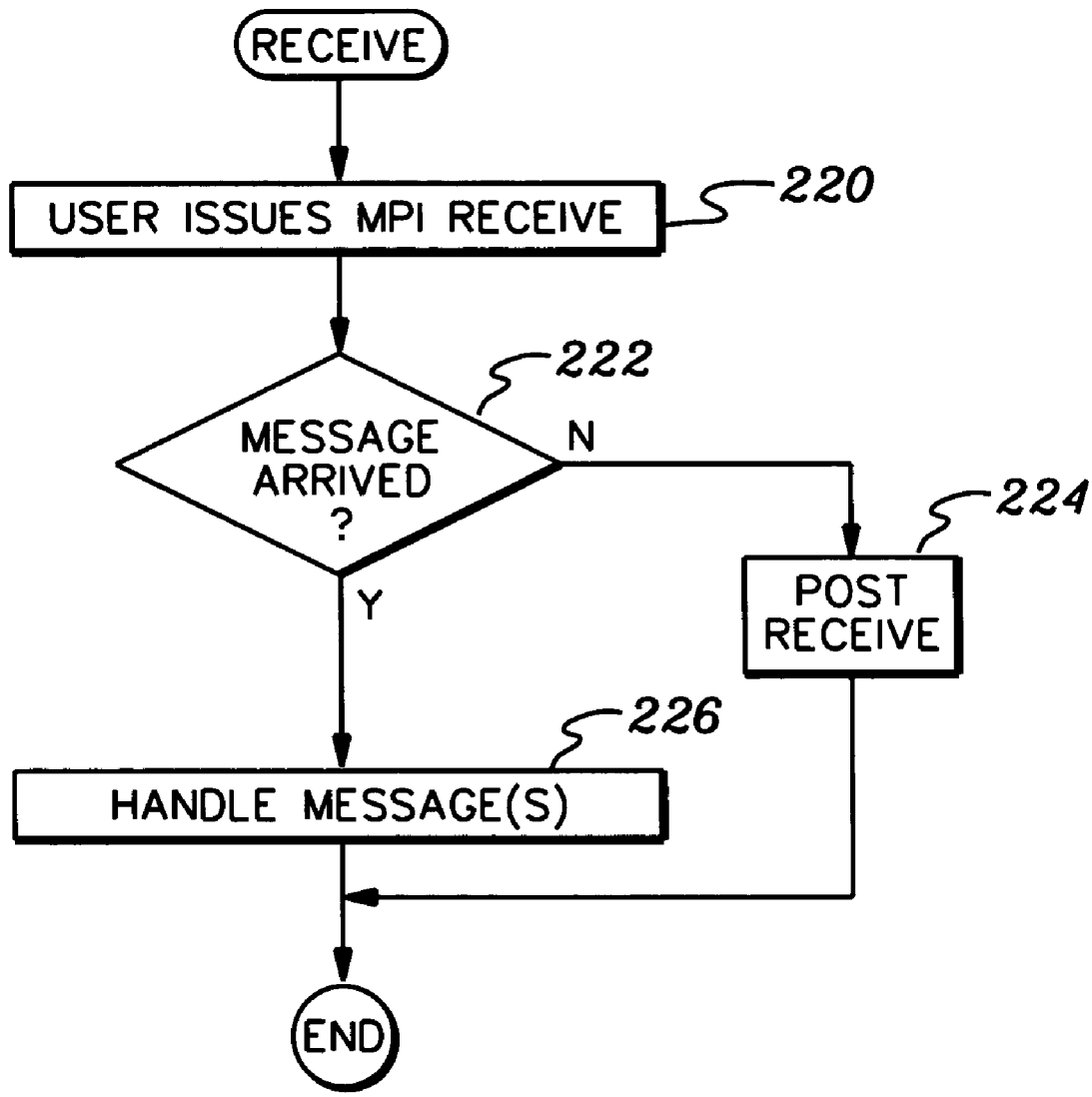
FIG. 2b depicts one embodiment of the logic associated with receiving by a receiver a message sent by a sender, in accordance with an aspect of the present invention.
Figure 3A:
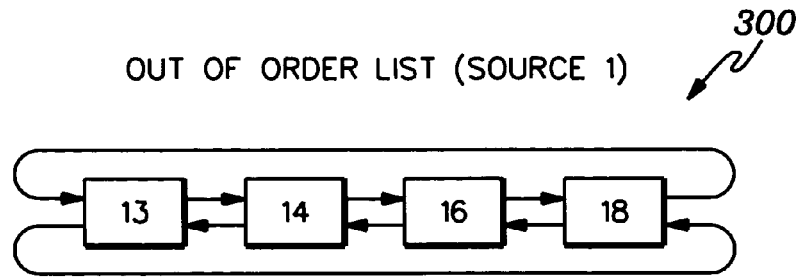
FIG. 3a depicts one embodiment of an out of order list used in accordance with an aspect of the present invention.
Figure 3B:
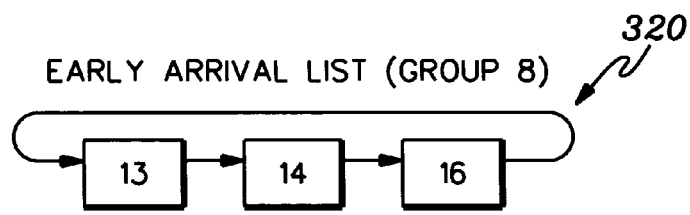
FIG. 3b depicts one embodiment of an early arrival list used in accordance with an aspect of the present invention.
Figure 3C:
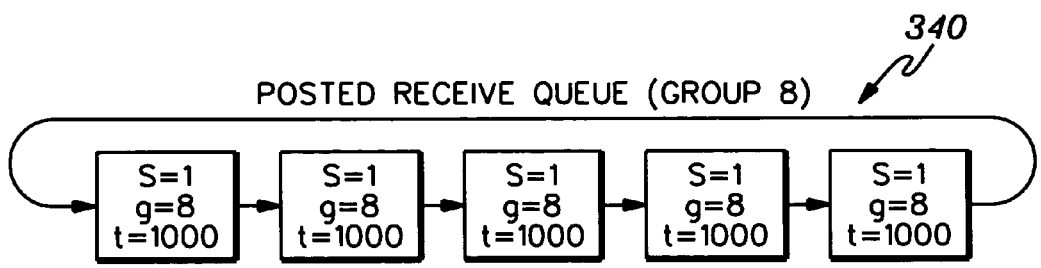
FIG. 3c depicts one embodiment of a posted receive queue used in accordance with an aspect of the present invention.

On the receive side, the user creates one or more data areas in the memory of the receiver and issues an MPI receive that specifies one of the data areas, as well as the source, tag and group from which it is to be matched by an incoming message, STEP 220 (FIG. 2b). In one example, the receive is a non-blocking receive, and thus, if the message has been sent and is matched, it will be provided to the user. Therefore, a determination is made as to whether any message has arrived, INQUIRY 222. If no message has arrived, then the receive is posted, STEP 224, and an indication of such is provided to the user. However, if a message has arrived, then that message and possibly others are handled by the MPI library, as described in further detail below, STEP 226.

The message transport layer (e.g., LAPI) being used in this example does not guarantee that messages will be received in the order that they are sent. However, the MPI Standard requires that messages be matched in order (i.e., the order in which they are sent (MPI calls this non-overtaking)). Therefore, logic is provided on the receiver, in accordance with an aspect of the present invention, to ensure proper ordering of the messages. To facilitate this proper ordering, a number of data structures are used, which are described with reference to FIGS. 3a-3d. Each of the data structures is maintained by MPI, for instance, in memory of the receiver.

As one example, one or more out of order lists 300 (FIG. 3a) are provided. Each list includes a list of messages received from a particular source (e.g., sender) that are out of order. In one example, there is an out of order list per source, and each list is a double linked list maintained in sequence order.

One or more early arrival lists 320 (FIG. 3b) are also provided, each of which includes messages that have been received prior to receives being posted for those messages on the receive side. In one example, there is an early arrival list for each group maintained in sequence order.

One or more posted receive queues 340 (FIG. 3c) are also used. Each queue includes the receives that have been posted. In one example, there is a posted receive queue for each group and it is ordered by the time of posting.

Additionally, an unmatched messages buffer 360 (FIG. 3d) is provided. The unmatched messages buffer includes a plurality of entries 362. Each entry is used to identify an unmatched message (e.g., a message that has arrived, but is out of sequence or a message for which no receive has been posted), and each entry includes, for instance, a sequence number 364, which is the message sequence number; a tag 366 used to identify the message; a group 368 indicating the group to which this message belongs; a source 370 identifying the sender of the message; and data 372.

The data structures are used to ensure the proper ordering of messages at the receiver. For example, when a message arrives at the receiver, processing is performed using the structures to determine whether the message is in proper sequence and whether it can be matched. One embodiment of the logic associated with handling messages and ensuring proper sequencing is described with reference to FIGS. 4a-4c. This logic is, for instance, implemented by MPI on the receiver. Although a particular processing order is described herein for clarity, it will be understood by those skilled in the art that many of the steps can occur in a different order than discussed herein. For instance, the posting of receives is discussed prior to receiving messages; however, a message can be received prior to a posting, etc.

Figure 4A:
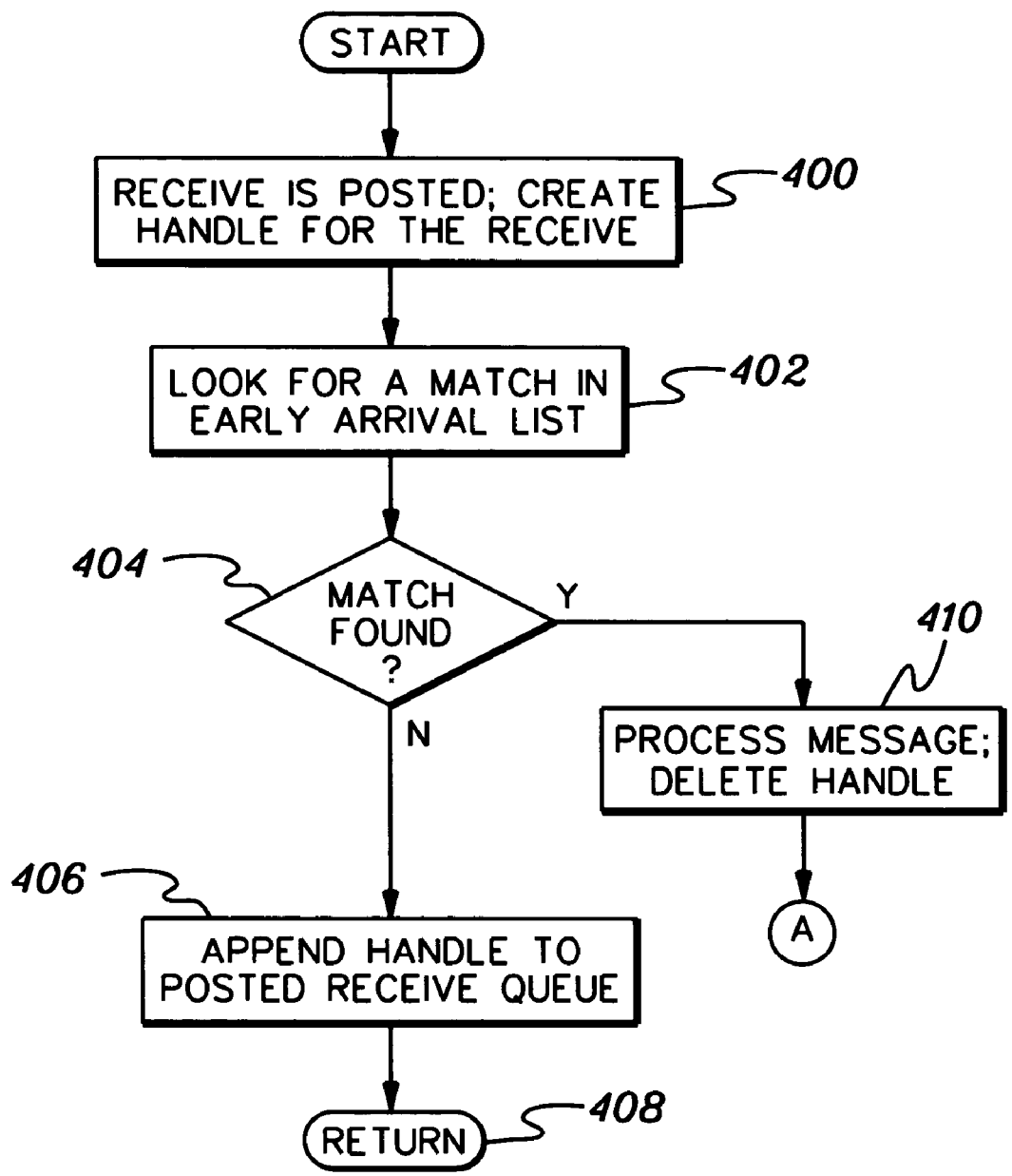
FIGS. 4a-4c depict one embodiment of the logic associated with handling messages received by a receiver, in accordance with an aspect of the present invention.

Referring initially to FIG. 4a, a receive is posted and a handle for the receive is created, STEP 400. Then, the early arrival list is checked for a match, STEP 402. That is, the early arrival list (which points to the unmatched messages buffer) is searched for a message that corresponds to the posted receive (e.g., same source, group, tag) and whose sequence number is next in order from that source. If a match is not found, INQUIRY 404, then the handle is appended to the posted receive queue, STEP 406, and processing returns, STEP 408.

Returning to INQUIRY 404, if, however, a match is found, then the message is processed and the handle is deleted, STEP 410. Processing of the message includes, for instance, copying the message from the communications subsystem into the user's buffer and returning status to the user.

Figure 4B:
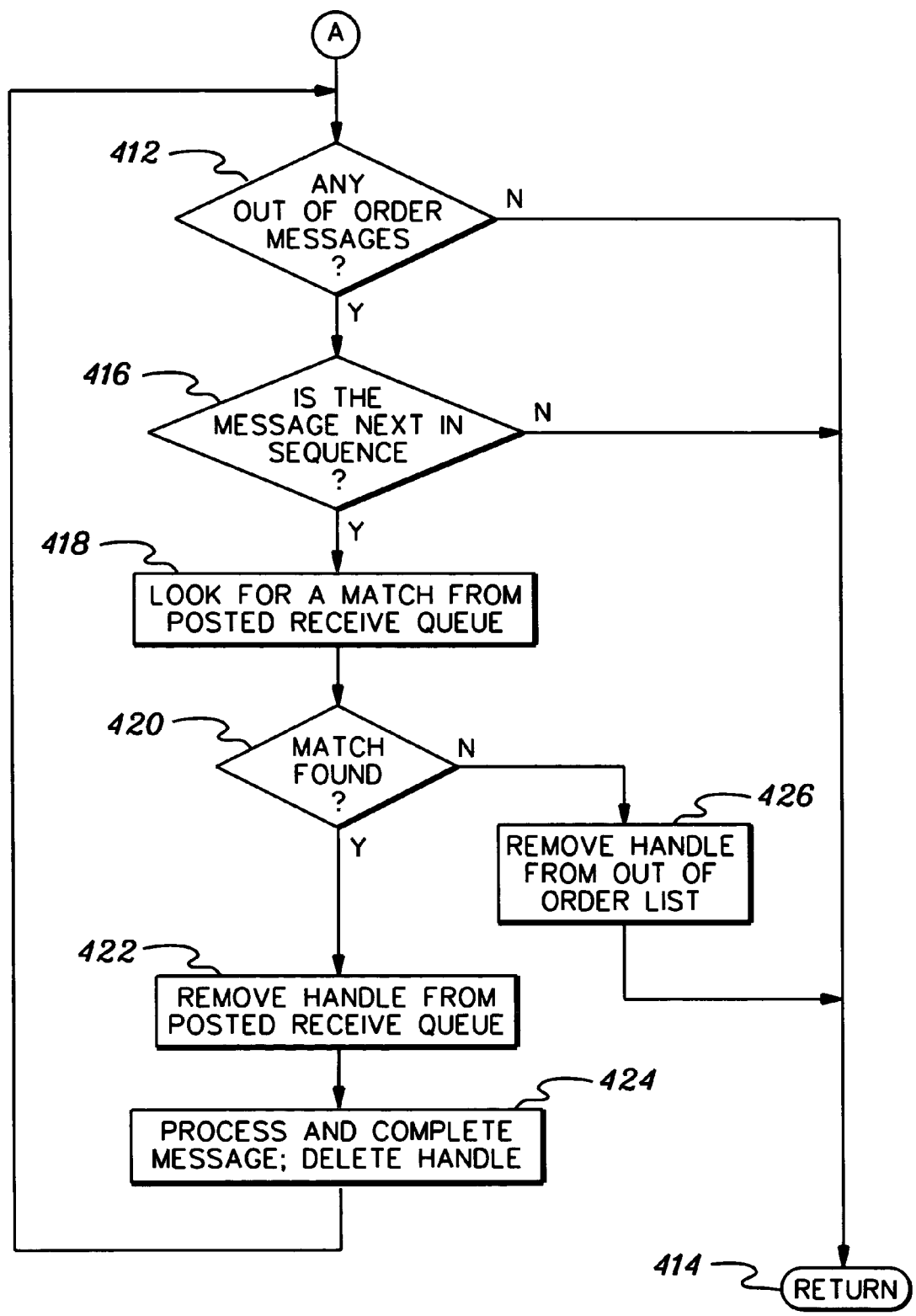

Thereafter, processing continues with determining whether any previously considered out of order messages can now be processed. Thus, an inquiry is made as to whether there are any out of order messages, INQUIRY 412 (FIG. 4b). For instance, the out of order message list for the source of the message just processed is checked for out of order messages. If no out of order messages are on the list, then processing returns, STEP 414. However, if there is one or more out of order messages on the list, then a further determination is made as to whether the message is next in sequence, INQUIRY 416. If not, then processing once again returns. However, if the message is next in sequence, then a check is made for a match from the posted receive queue, STEP 418. If a match is found, INQUIRY 420, then the handle is removed from the posted receive queue, STEP 422, and the message is processed and completed, STEP 424. Additionally, the handle is deleted, and the message is removed from the out of order list.

Returning to INQUIRY 420, if a match is not found, but the sequence is correct, then the handle is removed from the out of order list, STEP 426, and processing returns, STEP 414.

Figure 4C:
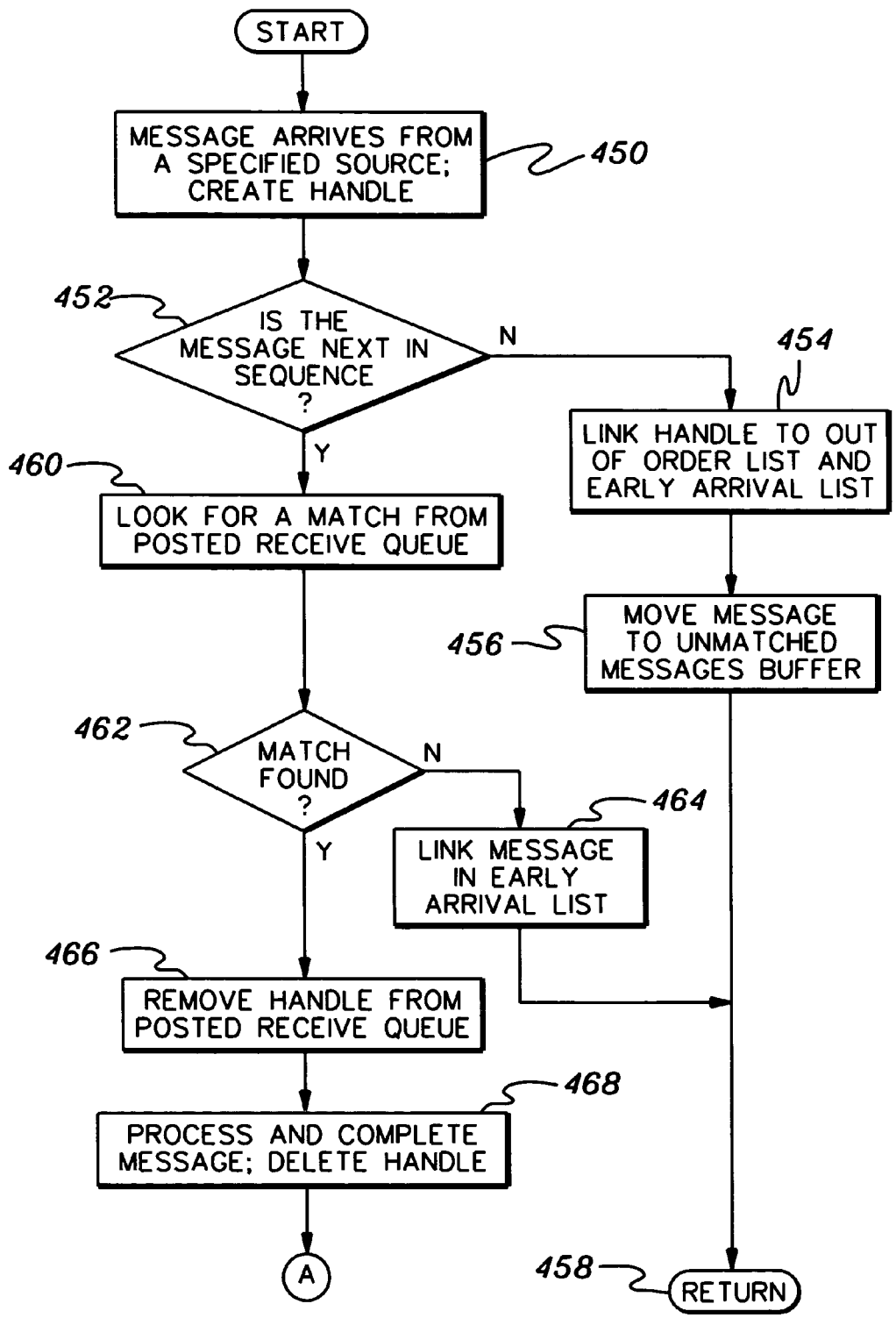

Referring to FIG. 4c, in response to a message arriving from a specified source, a handle is created, STEP 450. Then, a determination is made as to whether the message is next in sequence for that source, INQUIRY 452. If the message is not next in sequence, then the handle is linked to the out of order list and early arrival list, STEP 454. Additionally, the message is moved to the unmatched messages buffer, STEP 456. Processing then returns, STEP 458.

Returning to INQUIRY 452, if, however, the message is next in sequence, then the posted receive queue is searched for a match, STEP 460. If a match is not found, INQUIRY 462, then the message is linked in the early arrival list, STEP 464, and processing returns, STEP 458. However, if a match is found, then the handle is removed from the posted receive queue, STEP 466. Additionally, the message is processed and completed, STEP 468.

Thereafter, a determination is made as to whether there are any out of order messages, INQUIRY 412 (FIG. 4b). If there are out of order messages, then processing continues as described above. Otherwise, processing returns.

Described in detail above is a capability for ensuring that messages are matched in the proper order. One example of this processing is described with reference to FIG. 5. In the example, it is assumed that there are no unprocessed posted receives; Sequence Number 11 from Source 1 has been processed; Sequence Number 9 from Source 2 has been processed; all messages have Tag 1000; and the data structures are initially empty.

Figure 5:
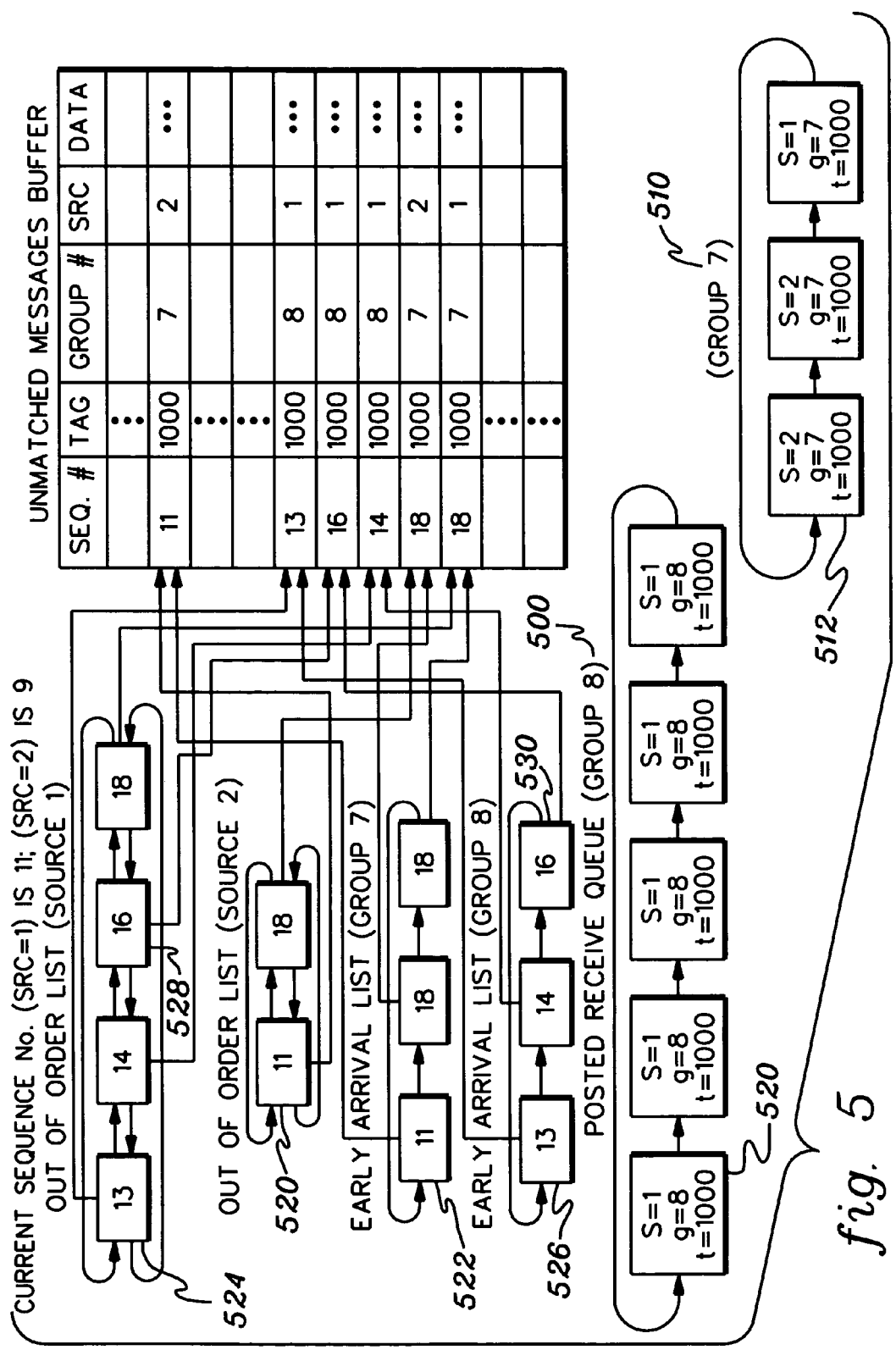
FIG. 5 illustrates one example of information stored in the various data structures used during processing of an aspect of the present invention.

Initially, a receive for a message in Group 8, Source 1, Tag 1000 is posted. In proceeding through the logic of FIG. 4a, it is indicated that no match in the early arrival list is found, and therefore, an entry is added to the posted receive queue for Group 8 (500—FIG. 5). A receive is posted four more times, and in each time, no match is found, and therefore, an entry is added to the posted receive queue. The results are the five entries in the posted receive queue for Group 8, as shown in FIG. 5.

Then, a receive is posted for a message in Group 7, Source 2, Tag 1000. Again, following the logic of FIG. 4a, no match is found in the early arrival list, and therefore, an entry is added to the posted receive queue for Group 7 (510). The same logic is repeated two more times for Group 7 (once for Source=2, and once for Source=1), and therefore, the posted receive queue of Group 7 includes three entries.

Further on, a message from Source 2, Sequence 11, Group 7, Tag 1000 arrives. Thus, the logic of FIG. 4c is processed. The message is not next in sequence, since the last message processed for Source 2 is Sequence 9; therefore, the handle is linked to the out of order list and early arrival queue, as shown at 520 and 522, respectively. Next, a message from Source 1, Sequence 13, Group 8, Tag 1000 arrives. Again, following the logic of FIG. 4c, it is indicated that message 13 is out of sequence, since the next message expected for Source 1 is Sequence 12. Thus, Sequence 13 is placed in the out of order list for Source 1, as shown at 524, and in an early arrival list for Group 8, as shown as 526. Next, a message from Source 1, Sequence 16, Group 8, Tag 1000 arrives. Again, the logic of FIG. 4c is followed and Sequence 16 is placed in the out of order list for Source 1, shown at 528, and the early arrival list for Group 8, shown at 530. Similar logic is applied for Sequence 14, Group 8, Source 1; Sequence 18, Group 7 Source 2; and Sequence 18, Group 7, Source 1. Thus, after all of these messages arrive, the data structures include the information that is shown in FIG. 5.

Next, a message from Source 1, Sequence 12, Tag 1000, Group 8 arrives. This time, when processing the logic of FIG. 4c, the message is next in sequence, since Sequence 11 was the last message processed for Source 1. Therefore, the posted receive queue is checked and a match is found. The handle from the posted receive queue is removed and the message is processed and completed. This includes moving the message to the user's buffer. The handle is then deleted. Processing then continues with handling the out of order messages for Source 1. In this example, three receives match and are removed from the posted receive queue, and Sequence Numbers 13 and 14 are removed from the out of order list and the early arrival queue.

Thereafter, a message from Source 1, Sequence 15, Tag 1000, Group 8 arrives. The logic of FIG. 4c is followed, which results in two receives being matched and removed from the posted receive queue, and Sequence Number 16 being removed from the out of order list and early arrival queue. Sequence 18 from Source 1 and Sequence 18 from Source 2 still exist in the early arrival list for Group 7 and also in the out of order list for their sources.

Described above is a technique for managing the arrival of messages at a receiver to ensure that messages that may arrive out of order are matched by the receiver in order. This technique uses, for instance, a message sequence number in combination with matching logic to ensure the proper sequencing. Data structures maintained in a particular order are used to facilitate and add efficiency to the ordering. For example, an entire list may not need to be searched to check for an out of order message.

Although a communications environment is provided herein, this environment is only one example. Many other types of communications environments may include and/or use one or more aspects of the present invention. For example, the communications environment need not be a parallel environment. Further, the communications units of the environment may be other than pSeries servers, and they can be homogeneous or heterogeneous. The connection may also vary. Further, the environment may include other than computing units. As a further example, the communications protocol may be other than MPI and/or LAPI.

Additionally, although various types of data structures have been described herein, others may be used without departing from the spirit of the present invention. Further, even though the sequence order described herein is an ascending sequence order, other sequence orders are possible (such as descending order or other predictable or agreed upon orders) and are considered a part of the claimed invention.

The present invention can be included in an article of manufacture having, for instance, tangible computer readable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing message arrival at a receiver of a message passing communications environment, said method comprising:
   determining at the receiver whether a message received by the receiver is a next message in sequence order from a sender, said determining using a sequence number of the message;
   linking the message to an out of order data structure, and placing the message in an unmatched messages buffer, in response to the message not being the next message in sequence order from the sender;
   ascertaining, in response to the determining indicating that the message is the next message in sequence order from the sender, whether the message matches a posted receive indication set by the receiver in a posted receive data structure at the receiver, the posted receive indication indicating that the receiver is ready to process the next message in sequence order from the sender; and
   responsive to the ascertaining, linking the message to an early arrival data structure, in response to the ascertaining failing to match the in sequence message with a posted receive indication in the posted receive data structure.

2. The method of claim 1, wherein the ascertaining comprises comparing one or more attributes of the message with one or more attributes of an entry of the posted receive data structure.

3. The method of claim 1, further comprising processing the message, in response to a match between the in sequence message and the posted receive indication, and removing the matching posted receive indication from the posted receive data structure and deleting the matching posted receive indication.

4. The method of claim 3, further comprising:
   determining whether an earlier message that was previously out of sequence is now in sequence from the sender, in response to the processing; and
   performing one or more tasks associated with the earlier message, in response to the determining indicating that the earlier message is now in sequence.

5. The method of claim 4, wherein the performing comprises:
   determining whether there is a posted receive indication for the earlier message in the posted receive data structure; and
   processing the earlier message, in response to the determining indicating that there is a posted received indication for the earlier message.

6. The method of claim 5, further comprising removing the earlier message from the out of order data structure, in response to the determining indicating that there is no posted receive indication for the earlier message.

7. A system of managing message arrival at a receiver of a message passing communications environment, said system comprising:
   means for determining at the receiver whether a message received by the receiver is a next message in sequence order from a sender, said means for determining using a sequence number of the message;
   means for linking the message to an out of order data structure, and placing the message in an unmatched messages buffer, in response to the message not being the next message in sequence order from the sender;
   means for ascertaining, in response to the means for determining indicating that the message is the next message in order from the sender, whether the message matches a posted receive indication set by the receiver in a posted receive data structure at the receiver, the posted receive indication indicating that the receiver is ready to process the next message in sequence order from the sender; and
   means for linking, responsive to the means for ascertaining, the message to an early arrival data structure, in response to the means for ascertaining failing to match the in sequence message to a posted receive indication in the posted receive data structure.

8. The system of claim 7, wherein the means for ascertaining comprises means for comparing one or more attributes of the message with one or more attributes of an entry of the posted receive data structure.

9. The system of claim 7, further comprising means for processing the message, in response to a match between the in sequence message and the posted receive indication, and for removing the matching posted receive indication from the posted receive data structure and deleting the matching posted receive indication.

10. The system of claim 9, further comprising:
means for determining whether an earlier message that was previously out of sequence is now in sequence from the sender, in response to the processing; and
means for performing one or more tasks associated with the earlier message, in response to the determining indicating that the earlier message is now in sequence.

11. The system of claim 10, wherein the means for performing comprises:
means for determining whether there is a posted receive indication for the earlier message in the receive data structure; and
means for processing the earlier message, in response to the determining indicating that there is a posted receive indication for the earlier message.

12. The system of claim 11, further comprising means for removing the earlier message from the out of order data structure, in response to the determining indicating that there is no posted receive indication for the earlier message.

13. An article of manufacture comprising:
at least one computer readable medium having embedded with computer readable program code logic to manage message arrival at a receiver of a message passing compunications environment, the computer readable program code logic comprising:
determine logic to determine at the receiver whether a message received by the receiver is a next message in sequence order from a sender, the determining using a sequence number of the message;
linking logic to link the message to an out of order data structure, and placing the message in an unmatched messages buffer, in response to the message not being the next message in sequence order from the sender;
ascertain logic to ascertain, in response to the determine logic indicating that the message is the next message in sequence order from the sender, whether the message matches a posted receive indication set by a the receiver in a posted receive data structure at the receiver, the posted receive indication indicating that the receiver is ready to process the next message in sequence order from the sender; and
linking logic, responsive to the ascertain logic, to link the message to an early arrival data structure, in response to the ascertain logic failing to match the in sequence message to a posted receive indication in the posted receive data structure at the receiver.

14. The article of manufacture of claim 13, further comprising:
process logic to process the message, in response to a match between the in sequence message and the posted receive indication, and to remove the matching posted receive indication from the posted receive data structure and delete the matching posted receive indication;
determine logic to determine whether an earlier message that was previously out of sequence is now in sequence from the sender, in response to the processing; and
perform logic to perform one or more tasks associated with the earlier message, in response to the determining indicating that the earlier message is now in sequence.

15. The article of manufacture of claim 14, wherein the perform logic comprises:
determine logic to determine whether there is a posted receive indication for the earlier message in the posted receive data structure; and
process logic to process the earlier message, in response to the determining indicating that there is a posted receive indication for the earlier message.

* * * * *